US005234311A

United States Patent [19]

Loduha, Jr. et al.

[11] Patent Number: 5,234,311

[45] Date of Patent: Aug. 10, 1993

[54] WHEELCHAIR LIFT WITH ADJUSTABLE POSTS

[75] Inventors: Andrew J. Loduha, Jr., North Hills; Stanton D. Saucier, Tarzana; Brian P. Jewett, Los Angeles; Jules M. Tremblay, Sunland, all of Calif.

[73] Assignee: Ricon Corporation, Pacoima, Calif.

[21] Appl. No.: 962,149

[22] Filed: Oct. 16, 1992

Related U.S. Application Data

[63] Continuation of Ser. No. 731,675, Jul. 17, 1991, abandoned.

[51] Int. Cl.$^5$ .................................... B60P 1/44

[52] U.S. Cl. .................................... 414/546; 414/917; 414/921

[58] Field of Search ............... 414/546, 555, 556, 540, 414/545, 917, 921; 248/295.1, 298, 333, 223.4

[56] References Cited

U.S. PATENT DOCUMENTS

| | | | |
|---|---|---|---|
| Re. 31,178 | 3/1983 | Deacon | 414/921 X |
| 4,003,479 | 1/1977 | Reyer | 414/921 X |
| 4,168,134 | 9/1979 | Pohl | 414/921 X |
| 4,265,586 | 5/1981 | Couture | 414/921 X |
| 4,446,587 | 5/1984 | Jump | 414/921 X |
| 4,563,121 | 1/1986 | Drews | 414/545 |
| 4,915,573 | 4/1990 | Wapner et al. | 414/921 X |
| 4,984,955 | 1/1991 | McCullough | 414/921 X |
| 4,991,810 | 2/1991 | Andrus et al. | 414/921 X |

OTHER PUBLICATIONS

Ricon Mini-Ride brochure, published by Ricon Corporation, Nov. 1989.

Ricon Classic brochure, published by Ricon Corporation, Nov. 1989.

*Primary Examiner*—David A. Bucci

*Attorney, Agent, or Firm*—Nilsson, Wurst & Green

[57] ABSTRACT

An adjustable wheelchair lift for a vehicle wherein the lift includes a platform, a mounting structure having two spaced apart, vertically extending, support posts mountable to the vehicle, a linkage for moving the platform to and from the vehicle and a chain-and-sprocket drive for moving the linkage. Each support post has a main portion and an adjustable portion, preferably both being channel shaped. The adjustable portion slides along the main portion until the desired height is reached. The channels also interlock at their edges to prevent lateral movement of the adjustable portion when it is unconnected to the main portion.

9 Claims, 3 Drawing Sheets

WHEELCHAIR LIFT WITH ADJUSTABLE POSTS

This is a continuation of application Ser. No. 07/731,675 filed on Jul. 17, 1991 and entitled "Wheelchair Lift With Adjustable Posts", now abandoned.

This invention relates to wheelchair lifts and, in particular, to a wheelchair lift that is mountable to a vehicle adjacent an access opening of the vehicle and that has a mounting structure that is adjustable in height to properly fit the access opening.

BACKGROUND OF THE INVENTION

Wheelchair lifts have been mounted directly to vans, trucks and buses for many years providing disabled individuals with better access to transportation, increasing their mobility and permitting them to achieve a more self-reliant, fully functional lifestyle. One such wheelchair lift is described in the patent to Deacon, U.S. Pat. No. Re. 31,178 wherein a vehicle mounted device for moving a wheelchair and its occupant to and from the inside of a vehicle is described.

In particular, the Deacon lift has a pair of parallelogram linkages, one mounted at each side of an access opening of a vehicle and extendable outwardly from the access opening. Each parallelogram linkage includes an upright support post that is mounted to the floor inside the vehicle. Each linkage also includes a vertical end post which is pivotally connected to the upright support post by a pair of parallel arms. A platform for receiving the wheelchair is mounted between and at the lower ends of the vertical end posts. A driveshaft with two sprocket and chain drives, one at each end of the shaft, is mounted on and between the upper ends of the upright support posts for operating each parallelogram linkage. In operation, the linkages move such that the platform is maintained in a substantially horizontal position as it is moved from the ground to the access opening adjacent the floor of the vehicle and vice versa.

A problem with the Deacon lift is that the driveshaft between the upper ends of the upright support posts restricts the headroom available when a wheelchair user enters the vehicle through the access opening. Preferably, the support posts of the lift are designed to extend above the top of the access opening such that the driveshaft is as high a possible. Achieving this solution, however, requires each lift to be specially designed and fabricated to take into account the door size of the particular model van, truck or bus to be fitted. Furthermore, the lift may be used either with the rear door opening or the side door opening of the van. The height of these openings, however, may also be different depending on the particular model, again requiring a specially made lift.

Accordingly, a need has arisen for a standardized wheelchair lift that is adaptable to a variety of vehicles regardless of the size access opening the particular vehicle may have. Such a lift would permit easier and safer access for a wheelchair user. It would also maximize headspace inside the vehicle which would allow a wheelchair user to more easily carry long or bulky items on or off the vehicle. Installing the lift to the vehicle would also be easier in that the upper ends of the support posts, being above the door opening and nearer the roof of the vehicle, may be secured to the door header or anywhere along a vertically extending doorpost. Additionally, if a vehicle required upgrading, e.g. enlargement of the access opening, or if a new vehicle were purchased, the same lift could be reinstalled onto the upgraded or new vehicle. Finally, a standardized lift would permit retail dealers to carry a number of lifts in inventory, eliminating the waiting period which was previously necessary for manufacturing and shipping a specially designed lift. Similarly, a manufacturer need not design or plan for as wide a range of lifts to account for the many possible variations of vehicles.

SUMMARY OF THE INVENTION

The present invention overcomes the problems of the prior art by employing a pair of adjustable support posts wherein the height of the posts may be varied in accordance with the height of the access opening of the vehicle. In particular, for the Deacon lift which utilizes a pair of parallelogram linkages, the support post for each linkage may be constructed of two telescoping pieces that are releasably secured to one another. A main post portion of the support post may be secured to the floor of the vehicle while an adjustable post portion which telescopes from the top of the main post portion supports the driveshaft and the chain and sprocket drive. Each adjustable post is raised as necessary such that the driveshaft clears the top of the access opening. Conventional fasteners, such as nuts and bolts, may be used to releasably secure the adjustable post to the main post.

In a preferred embodiment, the main post and adjustable post are a pair of aligned channels with the adjustable post closely received by and slidable along the outside of the main post. The two outwardly extending legs of each channel have aligned openings. When the aligned openings of the main post and adjustable post are aligned at the desired height, bolts may be used to secure the channels together. In order to maximize the moment resistant capacity of the overlapping portions of the posts, the channels are preferably secured together at the lower end of the channel forming the adjustable post and at the upper end of the channel forming the main post. An additional feature of the present invention is the use of interlocking edges on the outwardly extending legs of the channels to prevent lateral movement of the adjustable post when the height of the post is being changed.

In the preferred embodiment, a motor for driving the driveshaft is secured to the upper end of one of the adjustable posts. Additionally, the upper ends of the adjustable posts may be secured to the roof of the vehicle, or to the header over the access opening, or to a door post at the side or sides of the opening. The chains of the chain and sprocket drives are guided within the channels forming each support post. Plastic tubes may be inserted into the channels to prevent clattering of the chain against the post.

DETAILED DESCRIPTION

Figure 1:
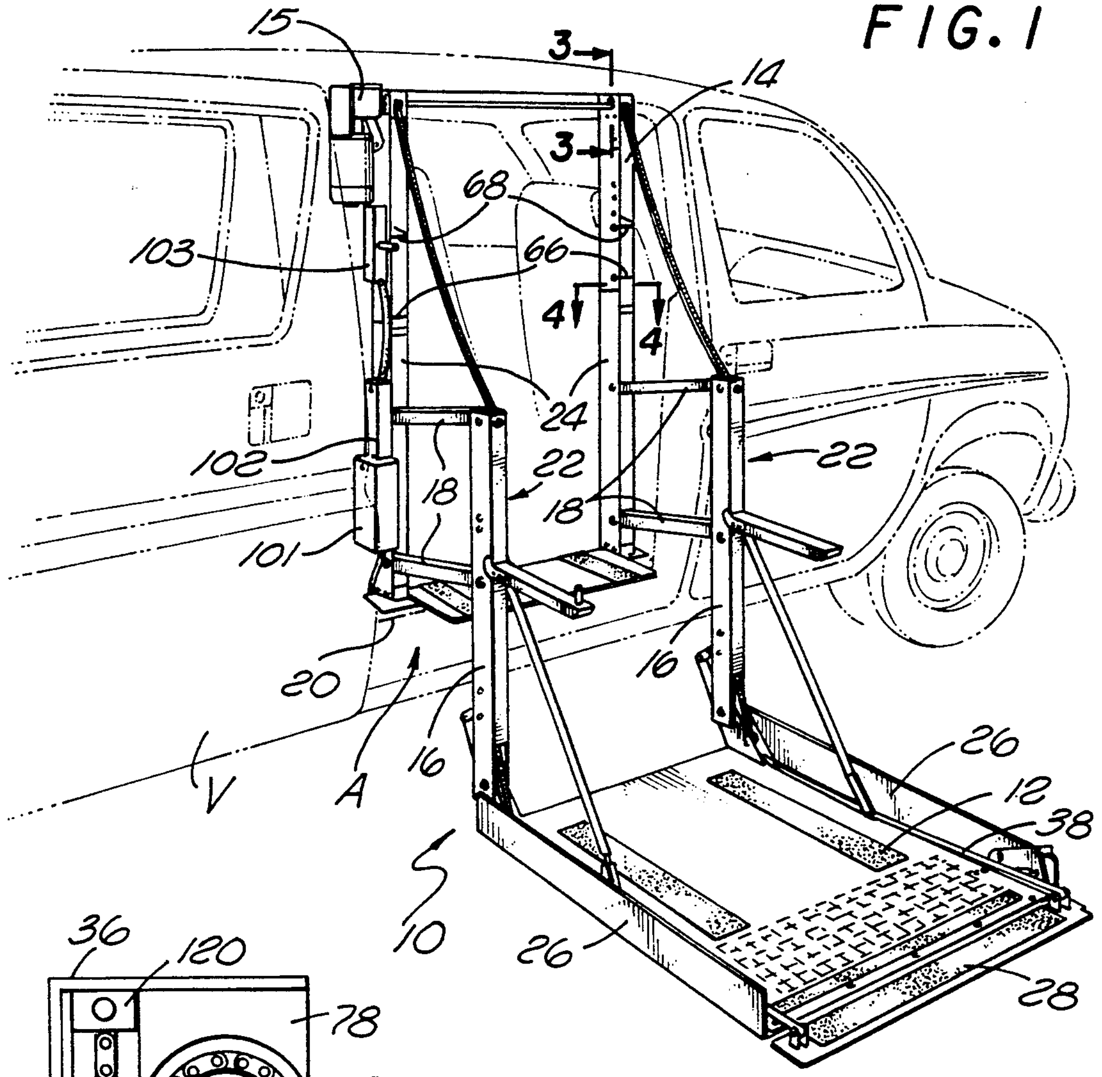
FIG. 1 is a perspective view showing a wheelchair lift embodying the present invention in a vehicle, the vehicle being shown in phantom.

A wheelchair lift 10 embodying the features of the present invention is shown in FIG. 1 mounted to a vehicle V adjacent an access opening A. The lift 10 includes a platform 12, an inner mounting structure 14 and a drive mechanism 15. The platform 12 is secured to the mounting structure 14 by spaced apart vertical end posts 16 and spaced apart pairs of parallel arms 18. The lift 10 is preferably of light weight aluminum alloy construction to reduce any affects on vehicle handling during driving.

The mounting structure 14 of the lift 10 is securely fastened to the inside bed or floor 20 of the vehicle V. It is also desirable, as will be described later, to secure the upper portion of the mounting structure to the vehicle either just above or adjacent to the sides of the access opening A.

As more fully explained in the Deacon patent (U S. Pat. No. Re. 31,178) which is hereby incorporated by reference, the mounting structure 14 includes a pair of upright support posts 24 which together with the two pairs of parallel arms 18 and the two vertical end.posts 16 form a pair of parallelogram linkages 22, one on each side and extendable outwardly from the access opening A of vehicle V. The linkages 22 are designed to maintain the platform 12 in a substantially horizontal position when it is raised from the ground (or loading position) to the floor of the vehicle (or entry position) and vice versa. In other words, when the platform 12 is in the loading position, a wheelchair (not shown) can be rolled onto the platform. The lift is then actuated to move the platform to the entry position, from which the wheelchair is rolled onto the floor 20 of the vehicle V. It should be understood that although exemplified in connection with a parallelogram linkage, the present invention may be used with any suitable linkage or other means that will move the platform between the loading position and the entry position.

The platform 12 may also be dimensioned to accommodate mobility devices other than a wheelchair, e.g. a gurney or a scooter. In either event, suitable safety features should be used on the platform, such as elongated guide rails 26 on each side of the platform and a pivotable end flap 28 which rotates from a horizontal position during loading of the platform to an upright position during raising or lowering of the platform.

Figure 2:
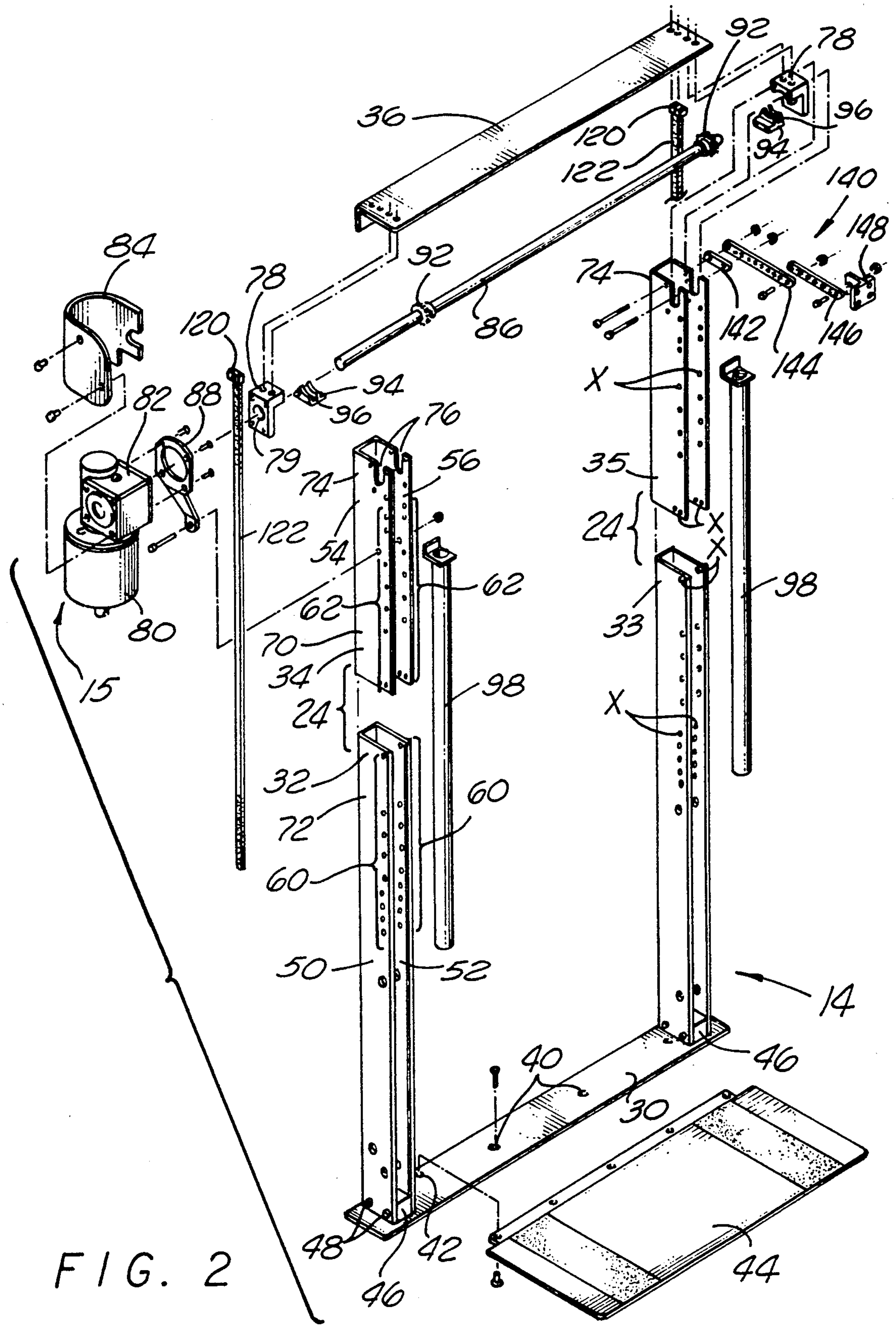
FIG. 2 is an exploded isometric view of a preferred embodiment of the inner mounting structure and drive mechanism of the present invention.

Referring to FIG. 2, the inner mounting structure 14 is shown having a base plate 30, the two support posts 24 and an alignment plate 36. Each support post has a main post portion 32, 33 and an adjustable post portion 34, 35. Preferably, the main posts and adjustable posts are channel shaped as shown. In the preferred embodiment, the support posts are also used to support miscellaneous electrical components 101, 102, 103 (see FIG. 1) for operating the lift.

The base plate has perforations 40 to insert bolts for securing the mounting structure 14 to the floor of the vehicle and additional perforations 42 for attachment of a cover plate 44. When the platform 12 is raised to the entry position, the cover plate 44 provides a bridge between the platform 12 and the floor of the vehicle (see FIG. 1). The main posts 32, 33 may be secured to the base plate 30 via a pair of alignment blocks 46 inserted within the channels and secured by bolts 48.

Figure 2A:
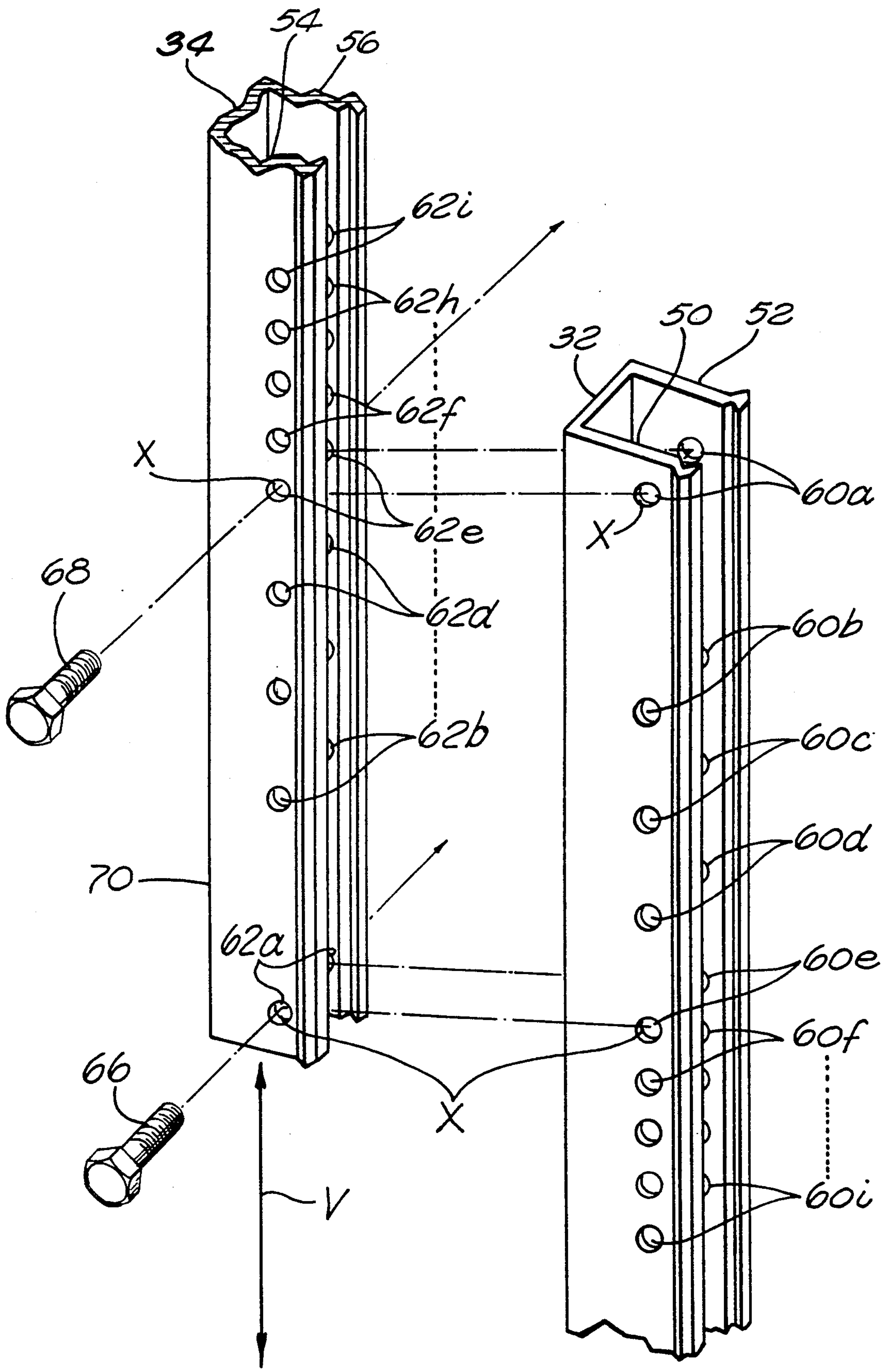
FIG. 2A is an enlarged, fragmentary perspective view of a portion of the support post showing the adjustable post laterally displaced from the main post for clarity.

Also, referring to FIG. 2A, the channel forming the main post 32 is shown having outwardly extending legs 50 and 52. The legs 50 and 52 have a first set of pairs of aligned openings 60 at the upper portion 72 of the main post 32 which are used to secure the main post 32 to a lower portion 70 of the adjustable post 34. The openings are spaced at predetermined intervals along the length of the main post to accommodate a variety of desired heights of the adjustable post.

In the preferred embodiment, the channel forming the adjustable post 34 is slightly larger than the channel forming the main post 32 so as to permit a sliding vertical movement of the adjustable post along the main post, as indicated by arrow V (see FIG. 2A). The channel forming the adjustable post 34 is shown outwardly extending legs 54 and 56. The legs 54 and 56 also have a second set of pairs of aligned openings 62 which are designed to cooperate with the first set of pairs of aligned openings 60 of the main post 32 when the main post 32 and adjustable post 34 are engaged. Upon determining the proper height of the top of the adjustable post 34, it is releasably secured to the main post 32. The arrangement described above is also used for main post 33 and adjustable post 35.

To achieve a suitably firm connection, it is recommended that the adjustable posts sufficiently overlap their respective main posts and that two bolts 66, 68 (See FIGS. 1 and 2A) be used for each connection. In the preferred embodiment, the two bolts 66, 68 are 11 inches apart vertically in the standard position, as shown in FIG. 2A. The openings 60 and 62 in the posts 32 and 34 respectively are designed such that the adjustable post may be raised from the standard position (designated by x-markings on posts 33 and 35 of FIGS. 2 and 2A) by two inch increments (to accommodate a larger access opening of a vehicle) or lowered from the standard position in one inch increments (to accommodate mini vans). As shown in detail in FIG. 2A, the standard position is achieved when the posts 32 and 34 are in the vertical sliding relationship with the bolts 66 and 68 inserted through pairs of openings **62*a* and 60*e*, and 62*e* and 60*a***, respectively.

For enabling adjustments in height in different predetermined increments from the standard position, subsets of pairs of openings **60*b*–60*d*, and 60*f*–60*i* of the main post 32 are positioned respectively above and below the openings 60*e* so that the subset 60*b*–60*d* therabove is relatively spaced in one predetermined increment from the openings 60*e* and the subset 60*f*–60*i* therebelow is relatively spaced in another predetermined increment from the opening 60*e***.

To align and cooperate with the main post 32, subsets **62*b*–62*d*, and 62*f*–62*i* of the adjustable posts 34 are positioned in such predetermined increments, but respectively below and above the openings 62*e*, to mirror the subsets 60*b*–60*d* and 60*f*–60*i***.

In the disclosed embodiment, the one predetermined increment for the subsets **60*b*–60*d* and 62*b*–62*d* is two inches. Similarly, the other predetermined increment for the subsets 60*f*–60*i* and 62*f*–62*i*** is one inch. It is noted that as the adjustable post is extended, is less overlap between the adjustable post and the main post, therefore it is important that the bolts be a maximum distance apart to maximize the moment resistant capacity of the connection.

Referring next to the drive mechanism 15, an electric motor 80 is shown in operative engagement with a gear box 82 having a cover 84. A driveshaft 86 operatively engaged with the gear box 82 extends horizontally outward from the gear box 82 and has two sprockets 92, each receiving a chain 122. The driveshaft 86 also supports the gear box. A torque plate 88 is used as an additional connection to secure the gear box 22 to the adjustable post 34.

At the upper end 74 of the adjustable post 34, U-shaped slots 76 are formed for receiving the shaft 86. A bearing block 78 having an opening 79 through which the driveshaft passes is fastened between the legs 54, 56 of the channel forming the adjustable post 34 to serve as the support for the shaft. The bearing block 78 may also be fastened to the alignment plate 36. The same arrangement is used for adjustable post 35.

Figure 3:
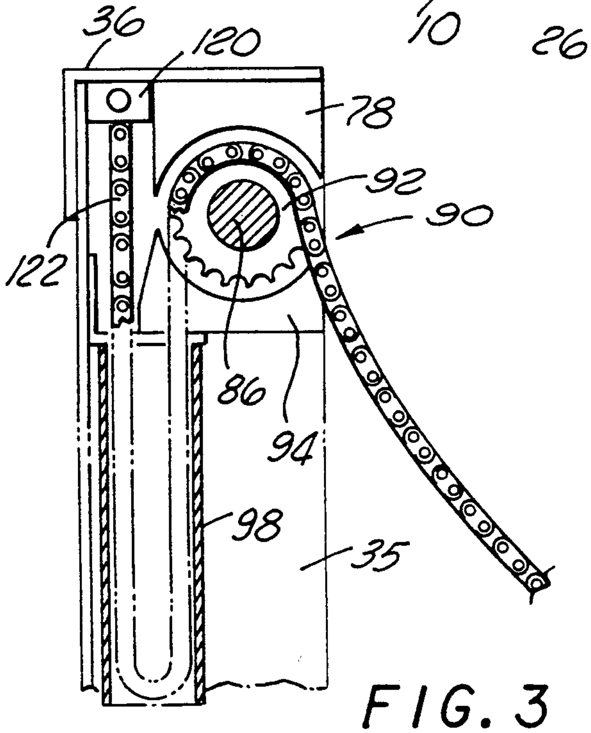
FIG. 3 is a cross-sectional side view taken along line 3—3 of FIG. 1 showing the upper portion of the inner mounting structure and the chain-and-sprocket drive, as assembled; and, FIG. 4 is a cross-sectional plan view taken along line 4—4 of FIG. 1 showing the interlocking adjustable post and main post.

A chain-and-sprocket drive 90 is shown in FIGS. 2 and 3 wherein an end piece 120 is fastened to the chain 122 and bolted to the alignment plate 36. The chain 122 is allowed to fall within the channels forming adjustable post 34 and main post 32 and is then turned back up the channels to train over the sprocket 92 on the driveshaft 86. Fastening the end of the chain to the mounting structure prevents it from fully running out of the channel. Also, permitting the chain to double back on itself is preferable to simply permitting the chain to stack on to and off of itself wherein the chain may more easily get tangled.

After being trained around the sprocket 92, the chain 22 is secured to the vertical end post 16 for operating the parallelogram linkage 22 (see FIG. 1). A similar chain-and-sprocket drive is utilized with the other adjustable post 35 and secured to the other vertical end post. Alternatively, the chain may pass vertically down through the vertical end post and be secured to the platform 12. Additionally, the chain 122 may be attached to the end flap 28 through a bar 38 (see FIG. 1) causing the end flap to move to its upright position whenever the lift is being raised or lowered.

To assist in stripping the chain 122 off the sprockets 92 during operation of the drive mechanism, pieces 94 having slots 96 for closely receiving the sprockets, may be used. To reduce clattering of the chains during operation of the lift, elongate plastic tubes 98 may be inserted into the channels forming the support posts 24 for receiving the chains prior to their training over the sprockets. The tubes 98 may be secured at their upper ends to the alignment plate 36. Protective covers (not shown) made of ABS plastic may also be attached to the open sides of each channel to hide the tubes and chains from view and also to act as a dust cover.

The above described embodiment of the present invention describes a standardized lift that can be easily and quickly installed in a wide variety of vehicles. It can be adjusted to fit access openings provided in full-sized vans or mini-vans, vans with standard or raised door openings, as well as in certain buses and trucks. It may also be installed in free-standing curb side structures used to provide wheelchair users with access to buses at bus stops.

Prior to installing the lift, the height of the access opening of the vehicle is measured. The adjustable posts are then slid upwardly until the upper ends 74 of the adjustable posts 34 are at the desired height. Bolts 66, 68 are then passed through the aligned openings 60 in the main posts and the corresponding aligned openings 62 in the adjustable posts and securely fastened.

Figure 4:
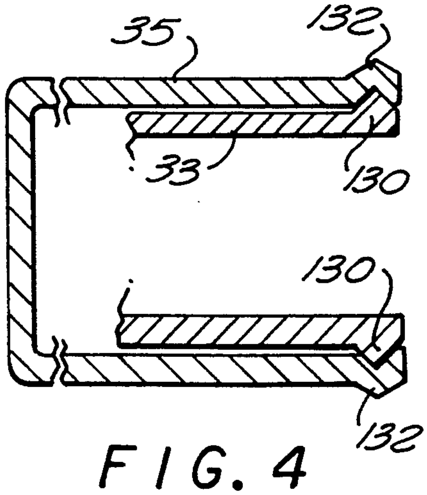

During the adjustment process, the adjustable posts have a tendency to tilt backward off of the main posts due to the weight of the motor and gear box concentrated on one end of the driveshaft. To prevent this, the main posts and adjustable posts are provided with an interlocking mechanism. Referring to FIG. 4, the legs of the channel forming the main post 33 are provided with angled protrusions 130 at their outer edges and the legs of the channel forming the adjustable post 35 are provided with corresponding bracketed portions 132 which cooperatively interlock the angled protrusions to prevent lateral movement of the adjustable posts while they are being raised or lowered past the main posts or when the adjustable posts are not otherwise secured to the main posts. Other shapes or structures for the interlocking mechanism may be used provided lateral movement is prevented.

After the proper height of the adjustable posts has been determined and the adjustable posts have been securely fastened to the main posts, the lift may then be installed into the vehicle in any conventional manner. Referring to FIG. 2, one fastening method is depicted wherein a bracket 140 for securing the mounting structure to a vehicle is shown. The bracket 140 includes a washer 142, a first perforated bar 144, a second perforated bar 146 and a T-fastener 148. The bracket 140 is secured at one end to the upper portion 74 of the adjustable post 35 and at the other end to the door header or door post of the vehicle. The perforations in the first bar may be offset from center such that when the bar is secured to the adjustable post, it slants upwardly or downwardly, as necessary. The second perforated bar acts as an extension piece, if needed. The same type of arrangement may also be connected to the other adjustable post.

Although the invention herein has been described with reference to particular embodiments, it is to be understood that these embodiments are merely illustrative of the principals and applications of the present invention. Consequently, the specific structural and functional details disclosed herein are merely representative and are deemed to afford the best embodiments known at this time. Furthermore, it is to be understood that numerous modifications may be made to the illustrative embodiments and that other arrangements may be devised without departing from the spirit and scope of the present invention as defined by the appended claim.

We claim:

1. A wheelchair lift mountable into an access space of a vehicle for moving a wheelchair to a bed of the vehicle from ground adjacent the vehicle and to the ground from the bed of the vehicle, the lift comprising:

a platform for receiving a wheelchair;

a mounting structure adapted to being affixed in said access space of said vehicle including at least one vertical support post having at least two telescopically-related post portions, each of said post portions having at least one opening representing a standard position, at least one of said post portions also having two subsets of openings relatively spaced at different predetermined increments respectively above and below said one opening, said vertical support post also having fastener means engaging selected of said openings for providing a plurality of telescopically-related positions including said standard position, raised positions, and lowered positions;

a linkage means secured between the mounting structure and the platform, said linkage means including a chain means extending within said support post and an elongated plastic-like tubular member mounted in said support post to receive said chain means; and a drive means for selectively moving the linkage means for driving the platform to move to and from the bed of the vehicle.

2. A wheelchair lift according to claim 1 wherein said post portion having said two subsets of openings is a main post portion, and said subset above said one opening is relatively spaced therefrom in one predetermined increment and said subset below said one opening is relatively spaced therefrom in another predetermined increment.

3. A wheelchair lift according to claim 2 wherein said one predetermined increment is two inches and said another predetermined increment is one inch.

4. A wheelchair lift according to claim 1 wherein said post portion having said two subsets of openings is an adjustable post portion, and said subset above said one opening is relatively spaced therefrom in one predetermined increment and said subset below said one opening is relatively spaced therefrom in another predetermined increment.

5. A wheelchair lift according to claim 4 wherein said one predetermined increment is one inch and said another predetermined increment is two inches.

6. A wheelchair lift according to claim 2 wherein other of said post portions having at least one opening representing a standard position is an adjustable post portion, said adjustable post portion having an additional two subsets of openings positioned respectively above and below said one opening, said additional subset above said one opening relatively spaced therefrom in said another predetermined increment and said additional subset below said one opening relatively spaced therefrom in said one predetermined increment to mirror said two subsets in said main post portion, for enabling alignment and cooperation between said subsets when said main post portion and said adjustable post portion are in said telescopically-related positions.

7. A wheelchair lift according to claim 1 wherein said mounting structure further includes a second vertically extending support post also connected to said platform by said linkage means, said second support post having a second main post portion and a second telescopically-related adjustable post to said second main post portion, said second vertical support post also having fastener means for fixing said second adjustable post portion to said second main post portion in said plurality of positions including said standard position, said raised positions, and said lowered positions.

8. A wheelchair lift mountable into an access space of a vehicle for moving a wheelchair to a bed of the vehicle from ground adjacent the vehicle and to the ground from the bed of the vehicle, the lift comprising:

a platform for receiving a wheelchair;

a mounting structure adapted to being affixed in said access space of said vehicle including a vertical support post having a main post portion and a telescopically-related adjustable post portion, each of said post portions having sets of openings where each set comprises at least one opening representing a standard position and subsets of openings relatively spaced at different predetermined increments from said one opening, said vertical support post also having fastener means for fixing said adjustable post portion to said main post portion by engaging selected of said openings for providing a plurality of telescopically-related positions including the standard position, raised positions, and lowered positions;

a linkage means including a chain means extending within said support post and secured between the mounting structure and the platform, and an elongated plastic-like tubular member mounted in said support post to receive said chain means; and a drive means for selectively moving the linkage means for driving the platform to move to and from the bed of the vehicle.

9. A wheelchair lift mountable into an access space of a vehicle for moving a wheelchair to a bed of the vehicle from ground adjacent the vehicle and to the ground from the bed of the vehicle, the lift comprising:

a platform for receiving a wheelchair;

a mounting structure adapted to being affixed in said access space of said vehicle including at least one vertical support post having at least two telescopically-related post portions, each of said post portions having at least one opening representing a standard position, at least one of said post portions also having two subsets of openings relatively spaced at different predetermined increments respectively above and below said one openings, said vertical support post also having fastener means engaging selected of said openings for providing a plurality of telescopically-related positions including said standard position, raised positions, and lowered positions;

a linkage means secured between the mounting structure and the platform, said linkage means including an elongated plastic-like tubular member mounted in said support post to receive a portion of the linkage means; and a drive means for selectively moving the linkage means for driving the platform to move to and from the bed of the vehicle.

* * * * *